US010531295B2

(12) United States Patent
McClement et al.

(10) Patent No.: US 10,531,295 B2
(45) Date of Patent: *Jan. 7, 2020

(54) IDENTITY AUTHENTICATION

(71) Applicant: Payfone, Inc., New York, NY (US)

(72) Inventors: Kristin Noelle McClement, Denver, CO (US); Matthew Emmett Brown, Englewood, CO (US); Michael Colten Brody, New York, NY (US); Christopher Cunningham, Highlands Ranch, CO (US)

(73) Assignee: Payfone, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,630

(22) Filed: Jan. 10, 2018

(65) Prior Publication Data

US 2018/0199196 A1 Jul. 12, 2018

Related U.S. Application Data

(63) Continuation of application No. 14/518,765, filed on Oct. 20, 2014, now Pat. No. 9,906,954.

(51) Int. Cl.
| | |
|---|---|
| *H04M 1/66* | (2006.01) |
| *H04W 12/06* | (2009.01) |
| *G06Q 30/00* | (2012.01) |
| *H04L 29/06* | (2006.01) |
| *H04W 12/00* | (2009.01) |

(52) U.S. Cl.
CPC ............ *H04W 12/06* (2013.01); *G06Q 30/00* (2013.01); *H04L 63/0853* (2013.01); *H04W 12/00514* (2019.01)

(58) Field of Classification Search
CPC . H04W 12/06; H04W 28/18; H04W 52/0203; H04W 52/0232
See application file for complete search history.

(56) References Cited

U.S. PATENT DOCUMENTS

| | | | |
|---|---|---|---|
| 6,049,712 | A | 4/2000 | Wallinder |
| 6,963,638 | B1 | 11/2005 | Keller |
| 7,720,887 | B2 | 5/2010 | McCormack |
| 8,606,640 | B2 | 12/2013 | Brody |
| 9,679,285 | B2 | 6/2017 | Brody |

(Continued)

FOREIGN PATENT DOCUMENTS

| | | |
|---|---|---|
| EP | 1-197-928 | 4/2002 |
| KR | 10-1006-0077541 | 7/2006 |

(Continued)

OTHER PUBLICATIONS

Authors et al, (Method and Apparatus for Mobile Identity Authentication, Publication date, Mar. 29, 2010).*

(Continued)

*Primary Examiner* — Khalid W Shaheed
(74) *Attorney, Agent, or Firm* — Berkeley Law & Technology Group, LLP

(57) ABSTRACT

Briefly, in accordance with one embodiment, a method and/or system for mobile identity authentication is disclosed. For example, mobile identity authentication may be employed in a variety of situations, including purchases, financial transactions, granted access to accounts, granting access to content, etc.

46 Claims, 4 Drawing Sheets

(56) References Cited

U.S. PATENT DOCUMENTS

| | | | |
|---|---|---|---|
| 9,747,596 | B2 | 8/2017 | Brody |
| 9,767,449 | B2 | 9/2017 | Brody |
| 2001/0037254 | A1 | 11/2001 | Glikman |
| 2002/0052754 | A1 | 5/2002 | Joyce et al. |
| 2002/0143634 | A1 | 10/2002 | Kumar et al. |
| 2003/0212601 | A1 | 11/2003 | Silva et al. |
| 2004/0143545 | A1 | 7/2004 | Kulakowski |
| 2004/0243477 | A1 | 12/2004 | Mathai et al. |
| 2005/0075945 | A1 | 4/2005 | Hodge |
| 2005/0114020 | A1 | 6/2005 | Muzaffar et al. |
| 2006/0116105 | A1* | 6/2006 | Frankel ............... G06Q 30/06 455/406 |
| 2006/0161646 | A1 | 7/2006 | Chene |
| 2006/0224470 | A1 | 10/2006 | Garcia Ruano |
| 2007/0027803 | A1 | 2/2007 | Brandes et al. |
| 2007/0043664 | A1 | 2/2007 | Wilkes |
| 2007/0055623 | A1 | 3/2007 | Ha et al. |
| 2007/0209051 | A1* | 9/2007 | Xu ........................ H04H 20/26 725/63 |
| 2007/0288377 | A1 | 12/2007 | Shaked |
| 2007/0299728 | A1 | 12/2007 | Nemirofsky et al. |
| 2007/0299773 | A1 | 12/2007 | Soderstrom |
| 2008/0125117 | A1 | 5/2008 | Jiang |
| 2008/0126261 | A1 | 5/2008 | Lovett |
| 2008/0139171 | A1 | 6/2008 | Bernath |
| 2008/0140548 | A1 | 6/2008 | Csoka |
| 2009/0006254 | A1 | 1/2009 | Mumm |
| 2010/0235276 | A1 | 9/2010 | Smith |
| 2010/0261477 | A1* | 10/2010 | Duran .................... H04W 4/10 455/445 |
| 2011/0276478 | A1* | 11/2011 | Hirson ................ G06Q 20/023 705/40 |
| 2013/0155875 | A1* | 6/2013 | Ayyasamy ............. H04W 4/08 370/242 |

FOREIGN PATENT DOCUMENTS

| | | |
|---|---|---|
| KR | 10-2007-0121618 | 12/2007 |
| KR | 10-2008-0003760 | 1/2008 |
| KR | 10-2008-0009671 | 1/2008 |

OTHER PUBLICATIONS

Carr, Mahil, *Mobile Payment Systems and Services: An Introduction*, IDRBT, Hyberarbad.

Karnouskos, Stamatis and Fokus, Fraunhofer, *Mobile Payment: A Journey Through Existing Procedures and Standardization Initiatives*, IEEE Communications Surveys, The Electronic Magazine of Original Peer-Reviewed Survey Articles, Fourth Quarter 2004, vol. 6, No. 4, http://www.comsoc.org/pubs/surveys.

Petrova, Krassie, *Mobile Payment: Towards a Customer-centric Model*, Auckland University of Technology, Auckland, New Zealand.

Rahimian, Vahid and Habibi, Jafar, *MPaySmart: A Customer Centric Approach in Offering Efficient Mobile Payment Services*, Department of Computer Engineering, Sharif University of Technology, Tehran, Iran.

Schwartz, Susana, *Standards Watch: Simpay: Reaching an Untapped Market*, Dec. 1, 2004, B/OSS: Billing & OSS World, http://vpico.com/articlemanager/printerfriendly.aspx?article=158968.

Soghoian, Christopher and AAD, IMAD, *Merx: Secure and Privacy Preserving Delegated Payments*, Berkman Center for Internet and Society, Harvard University, USA.

"USSD Notifications: Get Real-Time Feedback From Your Customers, Without the Need for an Internet Connection", http://www.txtnation.com/mobile-messaging/ussd-notifications/, accessed Aug. 15, 2017, 3 pages.

U.S. Appl. No. 12/583,151: Application filed Aug. 14, 2009, 100 Pages.

U.S. Appl. No. 12/583,151: Notice to File Missing Parts, Filing Receipt, dated Sep. 2, 2009, 5 Pages.

U.S. Appl. No. 12/583,151: Applicant Response to Pre-Exam Formalities Notice, dated Nov. 2, 2009, 7 Pages.

U.S. Appl. No. 12/583,151: Filing Receipt, dated Nov. 16, 2009, 3 Pages.

U.S. Appl. No. 12/583,151: Request for Corrected Filing Receipt, dated Dec. 10, 2009, 4 Pages.

U.S. Appl. No. 12/583,151: Filing Receipt, dated Dec. 22, 2009, 3 Pages.

U.S. Appl. No. 12/583,151: Non-Final Office Action, dated Jul. 15, 2010, 14 Pages.

U.S. Appl. No. 12/583,151: Preliminary Amendment, dated Jul. 19, 2010, 25 Pages.

U.S. Appl. No. 12/583,151: Rescind Nonpublication Request for Pre Grant Pub, dated Jul. 26, 2010, 1 Page.

U.S. Appl. No. 12/583,151: Non-Final Office Action Response, dated Nov. 15, 2010, 17 Pages.

U.S. Appl. No. 12/583,151: Notice of Publication, dated Nov. 18, 2010, 1 Page.

U.S. Appl. No. 12/583,151: Final Office Action, dated Jan. 28, 2011, 14 Pages.

U.S. Appl. No. 12/583,151: Response After Final Action, dated Apr. 1, 2011, 20 Pages.

U.S. Appl. No. 12/583,151: Advisory Action (PTOL-303), dated Apr. 15, 2011, 14 Pages.

U.S. Appl. No. 12/583,151: Non-Final Office Action Response, dated May 3, 2011, 17 Pages.

U.S. Appl. No. 12/583,151: Advisory Action (PTOL-303), dated May 31, 2011, 3 Pages.

U.S. Appl. No. 12/583,151: Notice of Appeal as Filed on Jun. 3, 2011, 3 Pages.

U.S. Appl. No. 12/583,151: Request for Continued Examination, dated Aug. 1, 2011, 15 Pages.

U.S. Appl. No. 12/583,151: Documents Submitted with 371 Applications, dated Oct. 7, 2011, 9 Pages.

U.S. Appl. No. 12/583,151: Non-Final Office Action, dated May 29, 2014, 15 Pages.

U.S. Appl. No. 12/583,151: Abandonment dated Dec. 5, 2014, 2 pages.

U.S. Appl. No. 12/804,438: Application filed Jul. 20, 2010, 105 Pages.

U.S. Appl. No. 12/804,438: Filing Receipt, Notice to File Missing Parts, dated Aug. 30, 2010, 56 Pages.

U.S. Appl. No. 12/804,438: Applicant Response to Pre-Exam Formalities Notice, dated Oct. 25, 2010, 9 Pages.

U.S. Appl. No. 12/804,438: Filing Receipt, dated Nov. 12, 2010, 3 Pages.

U.S. Appl. No. 12/804,438: Notice of Publication, dated Feb. 24, 2011, 1 Page.

U.S. Appl. No. 12/804,438: Documents Submitted with 371 Applications, dated Apr. 28, 2011, 8 Pages.

U.S. Appl. No. 12/804,438: Non-Final Office Action, dated Sep. 22, 2011, 14 Pages.

U.S. Appl. No. 12/804,438: Documents Submitted with 371 Applications, dated Oct. 7, 2011, 9 Pages.

U.S. Appl. No. 12/804,438: Non-Final Office Action Response, dated Mar. 27, 2012, 21 Pages.

U.S. Appl. No. 12/804,438: Final Office Action, dated Jun. 11, 2012, 16 Pages.

U.S. Appl. No. 12/804,438: Response After Final Action, dated Aug. 13, 2012, 22 pages.

U.S. Appl. No. 12/804,438: Advisory Action (PTOL-303), dated Aug. 29, 2012, 3 Pages.

U.S. Appl. No. 12/804,438: Notice of Appeal as Filed on Sep. 11, 2012, 1 Page.

U.S. Appl. No. 12/804,438: Response After Final Action, Appeal Brief as Filed on Nov. 19, 2012, 37 Pages.

U.S. Appl. No. 12/804,438: Examiner's Answer to Appeal Brief, dated Feb. 21, 2013, 11 Pages.

U.S. Appl. No. 12/804,438: Appeal Docketing Notice, dated May 31, 2013, 2 Pages.

U.S. Appl. No. 12/804,438: Request for Continued Examination (RCE), dated Sep. 10, 2013, 18 Pages.

(56) References Cited

OTHER PUBLICATIONS

U.S. Appl. No. 12/804,438: Dismissal of Appeal, dated Sep. 16, 2013, 2 Pages.
U.S. Appl. No. 12/804,438: Notice of Allowance and Fees Due (PTOL-85), dated Oct. 9, 2013, 7 Pages.
U.S. Appl. No. 12/804,438: Amendment after Notice of Allowance (Rule 312), Issue Fee Payment (PTO-85B), dated Oct. 29, 2013, 11 Pages.
U.S. Appl. No. 12/804,438: Response to Amendment under Rule 312, dated Nov. 8, 2013, 2 Pag.
U.S. Appl. No. 12/804,438: Issue Notification, dated Nov. 20, 2013, 1 Page.
U.S. Appl. No. 14/098,393: Application filed Dec. 5, 2013, 106 Pages.
U.S. Appl. No. 14/098,393: Preliminary Amendment, dated Dec. 10, 2013, 11 Pages.
U.S. Appl. No. 14/098,393: Filing receipt, Notice to File Missing Parts as Filed on Dec. 24, 2013, 5 Pages.
U.S. Appl. No. 14/098,393: Applicant Response to Pre-Exam Formalities Notice, dated Feb. 24, 2014, 5 Pages.
U.S. Appl. No. 14/098,393: Filing Receipt, dated Mar. 7, 2014, 3 Pages.
U.S. Appl. No. 14/098,393: Notice of publication, dated Jun. 19, 2014, 1 page.
U.S. Appl. No. 14/098,393: Application Data Sheet, filed Sep. 4, 2014, 6 pages.
U.S. Appl. No. 14/098,393: Non-Final Rejection, dated Aug. 23, 2016, 13 pages.
U.S. Appl. No. 14/098,393: Amendment/Req. Reconsideration After Non-Final Reject, dated Nov. 23, 2016, 47 pages.
U.S. Appl. No. 14/098,393: Final Rejection, dated Jan. 6, 2017, 16 pages.
U.S. Appl. No. 14/098,393: RCE and Amendments, dated Jun. 6, 2017, 40 pages.
U.S. Appl. No. 14/098,393: Notice of Allowance and Fees Due, dated Jun. 28, 2017, 8 pages.
U.S. Appl. No. 14/098,393: Amendment after Notice of Allowance, dated Jul. 21, 2017, 15 pages.
U.S. Appl. No. 14/098,393: Issue Fee Payment, dated Jul. 21, 2017, 1 page.
U.S. Appl. No. 14/098,393: Terminal Disclaimer Filed/Approved, dated Jul. 21, 2017, 3 pages.
U.S. Appl. No. 14/098,393: Response to Amendment under Rule 312, dated Jul. 27, 2017, 1 page.
U.S. Appl. No. 14/098,393: Filing Receipt, dated Jul. 31, 2017, 4 pages.
U.S. Appl. No. 14/098,393: Response to Amendment under Rule 312, dated Jul. 31, 2017, 3 pages.
U.S. Appl. No. 14/098,393: Issue Notification, dated Aug. 9, 2017, 1 page.
U.S. Appl. No. 14/098,401: Application filed Dec. 5, 2013, 106 Pages.
U.S. Appl. No. 14/098,401: Preliminary Amendment, dated Dec. 10, 2013, 10 Pages.
U.S. Appl. No. 14/098,401: Notice to File Missing Parts, dated Dec. 26, 2013, 5 Pages.
U.S. Appl. No. 14/098,401: Applicant Response to Pre-Exam Formalities Notice, dated Feb. 24, 2014, 5 Pages.
U.S. Appl. No. 14/098,401: Filing Receipt, dated Mar. 7, 2014, 3 Pages.
U.S. Appl. No. 14/098,401: Notice of Publication, dated Jun. 19, 2014, 1 page.
U.S. Appl. No. 14/098,401: Application Data Sheet, filed Sep. 4, 2014, 6 pages.
U.S. Appl. No. 14/098,401: Non-Final Rejection, dated Aug. 24, 2016, 13 pages.
U.S. Appl. No. 14/098,401: Amendment/Req. Reconsideration After Non-Final Reject, dated Nov. 23, 2016, 46 pages.
U.S. Appl. No. 14/098,401: Final Rejection, dated Jan. 5, 2017, 13 pages.
U.S. Appl. No. 14/098,401: RCE and Amendments, dated Apr. 5, 2017, 19 pages.
U.S. Appl. No. 14/098,401: Applicant Initiated Interview Summary and Office Action Appendix, dated Apr. 7, 2017, 4 pages.
U.S. Appl. No. 14/098,401: Notice of Allowance and Fees Due, dated Apr. 28, 2017, 8 pages.
U.S. Appl. No. 14/098,401: Issue Fee Payment, dated May 11, 2017, 1 page.
U.S. Appl. No. 14/098,401: Electric Terminal Disclaimer, dated May 11, 2017, 3 pages.
U.S. Appl. No. 14/098,401: Issue Notification, dated May 24, 2017, 1 page.
U.S. Appl. No. 14/267,878: Application filed May 1, 2014, 116 Pages.
U.S. Appl. No. 14/267,878: Notice to File Missing Parts, dated May 19, 2014, 6 Pages.
U.S. Appl. No. 14/267,878: Response to NFMP, filed Aug. 21, 2014, 4 pages.
U.S. Appl. No. 14/267,878: Filing Receipt, dated Aug. 26, 2014, 4 pages.
U.S. Appl. No. 14/267,878: Application Data Sheet, filed Sep. 4, 2014, 7 pages.
U.S. Appl. No. 14/267,878: Notice of Publication, dated Dec. 4, 2014, 1 page.
U.S. Appl. No. 14/267,878: Requirement for Restriction/Election, dated Dec. 21, 2016, 6 pages.
U.S. Appl. No. 14/267,878: Response to Election/Restriction, dated Feb. 21, 2017, 8 pages.
U.S. Appl. No. 14/267,878: Non-Final Rejection, dated Mar. 8, 2017, 16 pages.
U.S. Appl. No. 14/267,878: Amendment/Req. Reconsideration-After Non-Final Reject, dated Jun. 8, 2017, 32 pages.
U.S. Appl. No. 14/267,878: Notice of Allowance and Fees Due, dated Jul. 6, 2017, 8 pages.
U.S. Appl. No. 14/267,878: Amendment after Notice of Allowance, dated Jul. 21, 2017, 8 pages.
U.S. Appl. No. 14/267,878: Issue Fee Payment, dated Jul. 21, 2017, 1 page.
U.S. Appl. No. 14/267,878: Response to Amendment under Rule 312, dated Aug. 17, 2017, 3 pages.
U.S. Appl. No. 14/267,878: Filing Receipt, dated Aug. 23, 2017, 4 pages.
U.S. Appl. No. 14/267,878: Issue Notification, dated Aug. 30, 2017, 1 page.
U.S. Appl. No. 15/657,093: Application filed Jul. 21, 2017, 116 pages.
U.S. Appl. No. 15/657,093: Preliminary Amendment, dated Jul. 21, 2017, 6 pages.
U.S. Appl. No. 15/657,093: Filing Receipt, dated Aug. 3, 2017, 4 pages.
U.S. Appl. No. 15/657,093: Notice of Publication, dated Nov. 9, 2017, 1 page.
U.S. Appl. No. 13/373,069: New Application filed Nov. 3, 2011, 65 pages.
U.S. Appl. No. 13/373,069: Notice to File Missing Parts, dated Nov. 21, 2011, 2 pages.
U.S. Appl. No. 13/373,069: Filing Receipt, dated Nov. 21, 2011, 3 pages.
U.S. Appl. No. 13/373,069: Filing Receipt dated Apr. 30, 2012, 3 pages.
U.S. Appl. No. 13/373,069: Notice of Publication, dated Aug. 9, 2012, 1 page.
U.S. Appl. No. 13/373,069: Non Final Rejection and Examiner Search, dated Dec. 1, 2014, 12 pages.
U.S. Appl. No. 13/373,069: Abandonment dated Jun. 22, 2015, 2 pages.
U.S. Appl. No. 14/518,765: Application filed Oct. 20, 2014, 81 pages.
U.S. Appl. No. 14/518,765: Filing Receipt, dated Oct. 27, 2014, 3 pages.
U.S. Appl. No. 14/518,765: Notice of Publication, dated Apr. 21, 2016, 1 page.

(56) References Cited

OTHER PUBLICATIONS

U.S. Appl. No. 14/518,765: Non-Final Rejection, dated May 17, 2017, 20 pages.
U.S. Appl. No. 14/518,765: Amendment/Req. Reconsideration—After Non-Final Reject, dated Jun. 9, 2017, 22 pages.
U.S. Appl. No. 14/518,765: Notice of Allowance and Fees Due, dated Oct. 11, 2017, 15 pages.
U.S. Appl. No. 14/518,765: Issue Fee Payment, dated Jan. 10, 2016, 1 page.
U.S. Appl. No. 14/518,765: Amendment after Notice of Allowance, dated Jan. 10, 2018, 22 pages.
PCT/US2010/002043: Written Opinion, dated Jan. 24, 2011, 5 pages.
PCT/US2010/002043: International Preliminary report on Patentability, dated Feb. 14, 2012, 6 pages.
PCT/US2010/002043: ISR filed Jul. 20, 2010, 3 pages.
PCT/US2010/003027: application as filed, filed Jul. 20, 2010, 54 pages.
PCT/US2010/003027: Written Opinion, dated Jun. 23, 2011, 4 pages.
PCT/US2010/003027: Publication, dated May 26, 2011, 54 pages.
PCT/US2010/003027: International Preliminary report Patentability, dated May 30, 2012, 5 pages.
PCTCA 2774713/ application as filed Jul. 20, 2010, 79 pages.
EP2010808435: claim amendments filed in EU application, filed Oct. 15, 2012, 11 pages.
WIPO, International Search Report, dated Nov. 23, 2011, Korea.
WIPO, Written Opinion of the International Searching Authority, dated Nov. 23, 2011, Korea.
WIPO, International Search Report, dated Jun. 26, 2012, Korea.
WIPO, Written Opinion of the International Searching Authority, dated Jun. 26, 2012, Korea.
U.S. Appl. No. 15/657,093: Non-Final Rejection, dated Dec. 28, 2018, 9 pages.
U.S. Appl. No. 16/143,205: Application and Preliminary Amendment as filed on Sep. 26, 2018, 121 pages.
U.S. Appl. No. 16/143,205: Request for Corrected Filing Receipt, dated Nov. 2, 2018, 12 pages.
U.S. Appl. No. 16/143,205: Filing Receipt, dated Nov. 7, 2018, 4 pages.
U.S. Appl. No. 16/143,205: Notice of Publication, dated Feb. 14, 2019, 1 page.
U.S. Appl. No. 15/657,093: Amendment/Req. Reconsideration—After Non-Final Reject, dated May 16, 2019, 18 pages.

\* cited by examiner

FIG. 1

SAMPLE DB ENTRY EMBODIMENT

DB ENTRY

Attributes

Mobile Service Provider Account identifier

Unique alias

Mobile telephone number

IMSI

Mobile Service Provider

Type of Network of Mobile Service Provider

ETC.

FIG. 2

SAMPLE EXPANDED DB ENTRY EMBODIMENT

EXPANDED DB ENTRY FOR A PARTICULAR MOBILE SUBSCRIBER

Additional Attributes

Mobile telephone number ported? (Yes/No)

Replacement Mobile Service Provider after Porting

Change in mobile device? (Yes/No)

Identification of replacement mobile device

Mobile telephone number changed? (Yes/No)

Replacement mobile telephone number

De-activation date of previous mobile telephone number

Activation date of replacement mobile telephone number

ETC.

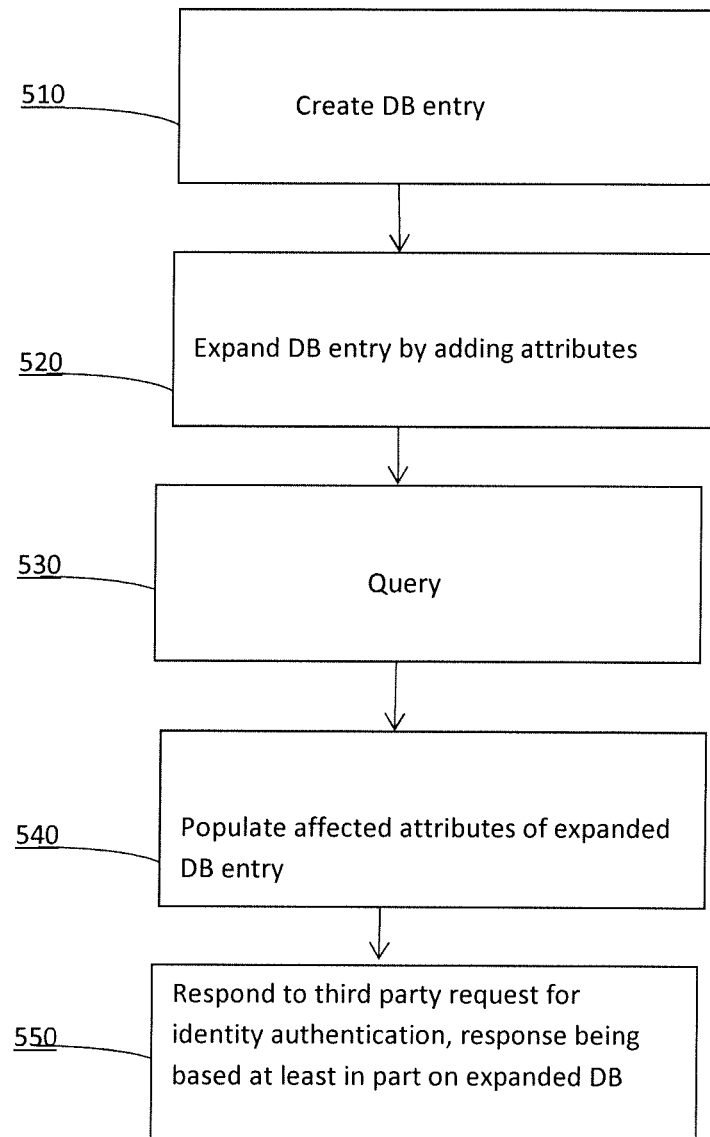

IDENTITY AUTHENTICATION

BACKGROUND

1. Field

The present disclosure relates generally to authentication, such as authentication of a persistent identity, for example.

2. Information

For a variety of transactions, including financial, but also including online and/or in-store purchases, which may include goods and/or services, for improved convenience and/or potentially for other reasons, it may be desirable to have an ability to authenticate a user/customer/subscriber/purchaser, typically before completing a transaction. For example, in a world in which mobile devices, such as cellular telephones, have become ubiquitous, and in which, for example, a mobile subscriber, for example, may have established an identity with a mobile service provider, a third party, which may again include, but is not limited, to an online merchant, may be willing to interact with a user (e.g., customer, subscriber, purchaser, etc. to sell, extend services, provide access to content, etc.) if identity may be authenticated, such as via a mobile provider, for example.

Of course, given the nature of transactions, especially with a mobile, electronic world and with transactions taking place via communications networks around the clock and around the world, it may be useful to be able to perform identity authentication, such as mobile identity authentication (MIA), relatively quickly, such as in real-time or nearly so. This and/or other aspects of identity authentication continue to present challenges.

BRIEF DESCRIPTION OF DRAWINGS

Claimed subject matter is particularly pointed and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

FIG. 1 is a schematic diagram of an example embodiment of a database (DB) entry for use in identity authentication, such as MIA FIG. 2 is a schematic diagram of an example embodiment of an expanded database (DB) entry for use in identity authentication, such as MIA;

FIG. 4 is a flowchart of an example embodiment of a method of identity authentication, such as MIA.

Figure 3:
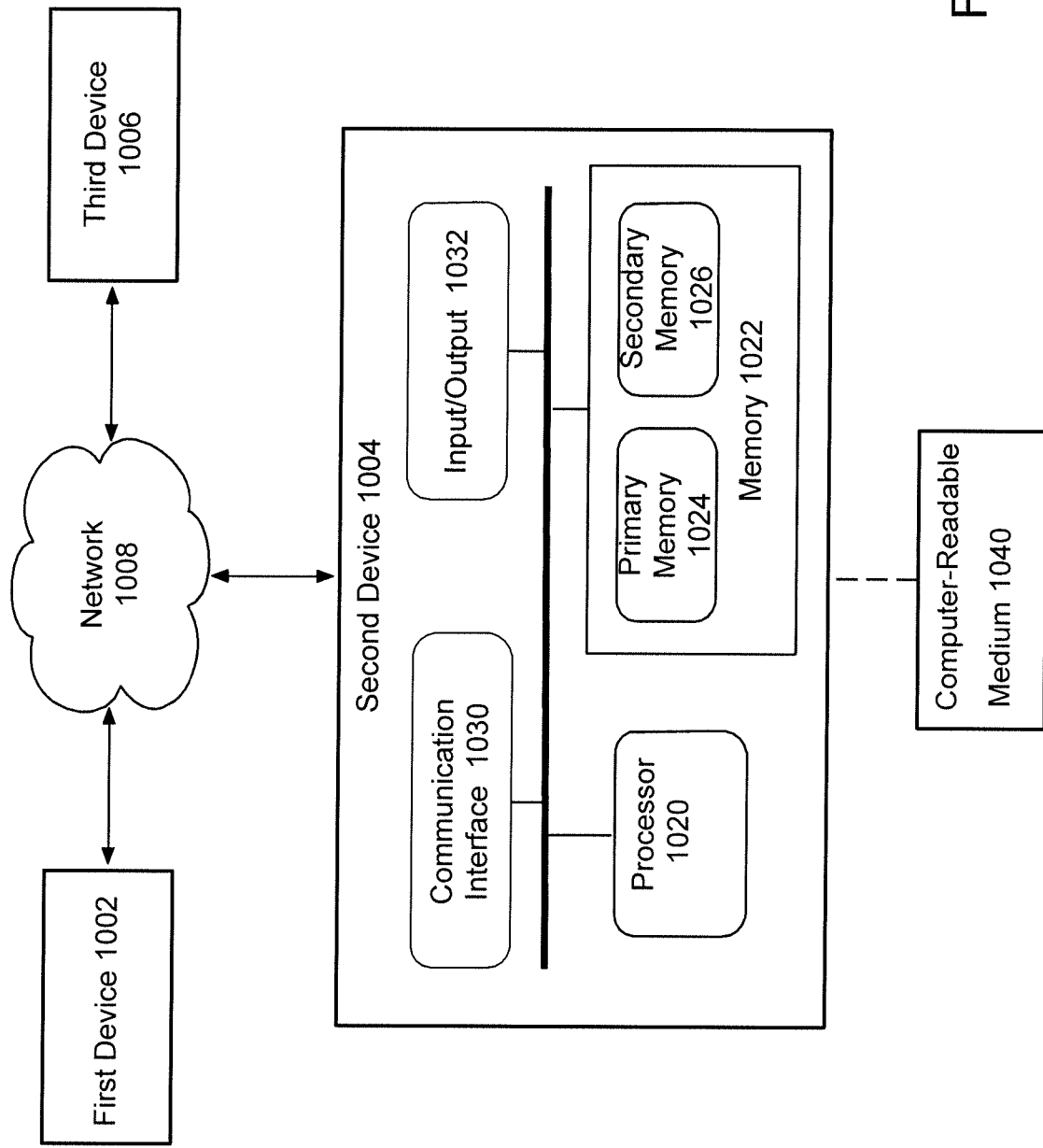
FIG. 3 is a schematic diagram of a computing device in a networking environment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which apportions of a computational problem may be allocated among computing devices, including one or more clients and one or more servers, via a computing and/or communications network, for example.

A network may comprise two or more network devices and/or may couple network devices so that signal communications, such as in the form of signal packets and/or frames, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Sub-networks may also comprise links, such as physical links, connecting and/or coupling nodes to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting network communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate noes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets and/or frames to be communicated between LANs. The term world wide web (WWW or web) and/or similar terms may also be used, although it refers to a sub-portion of the Internet that complies with the Hypertext Transfer Protocol or HTTP. For example, network devices may engage in an HTTP session through an exchange of Internet signal packets and/or frames. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language ("XML") may also be utilized to specify content and/or format of hypermedia type content, such as in the form of a file or an "electronic document," such as a web page, in an embodiment. Of course, HTML and XML are merely example languages provided as illustrations and, furthermore, HTML and/or XML is intended to refer to any version, now known and/or later developed. Likewise, claimed subject matter is not intended to be limited to examples provided as illustrations, of course.

The term "web site" and/or similar terms refer to a collection of related web pages, in an embodiment. The term "web page" and/or similar terms relates to any electronic file and/or electronic document, such as may be accessible via a network, by specifying a uniform resource locator (URL) for accessibility via the web, in an example embodiment. As alluded to above, a web page may comprise content coded using one or more languages, such as, for example, HTML and/or XML, in one or more embodiments. Although claimed subject matter is not limited in scope in this respect. Also, in one or more embodiments, developers may write code in the form of JavaScript, for example, to provide content to populate one or more templates, such as for an application. Here, JavaScript is intended to refer to any now known or future versions. However, JavaScript is merely an example programming language. As was mentioned, claimed subject matter is not limited to examples or illustrations.

Terms including "entry", "electronic entry", "document", "electronic document", "content", "digital content", "item", and/or similar terms are meant to refer to signals and/or states in a format, such as a digital format, that is perceivable by a user, such as if displayed and/or otherwise played by a device, such as a digital device, including, for example, a computing device. In an embodiment, "content" may comprise one or more signals and/or states to represent physical measurements generated by sensors, for example. For one or more embodiments, an electronic document may comprise a web page coded in a markup language, such as, for example, HTML (hypertext markup language). In another embodiment, an electronic document may comprise a portion and/or a region of a web page. However, claimed subject matter is not limited in these respects. Also, for one or more embodiments, an electronic document and/or electronic entry may comprise a number of components. Components in one or more embodiments may comprise text, for example as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

Signal packets and/or frames, also referred to as signal packet transmissions and/or signal frame transmissions, and may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path comprising a portion of the Internet, from a site via an access node coupled to the Internet. Likewise, a signal packet and/or frame may be forwarded via network nodes to a target site coupled to a local network, for example. A signal packet and/or frame communicated via the Internet, for example, may be routed via a path comprising one or more gateways, servers, etc. that may, for example, route a signal packet and/or frame in accordance with a target and/or destination address and availability of a network path of network nodes to the target and/or destination address. Although the Internet comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer model. Although physically connecting a network via a hardware bridge is done, a hardware bridge may not, by itself, typically include a capability of interoperability via higher level layers of a network protocol. A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol, such as protocols characterized substantially in accordance with the aforementioned OSI model, has several layers. These layers may be referred to here as a network stack. Various types of network transmissions may occur across various layers. A lowest level layer in a network stack, such as the so-called physical layer, may characterize how symbols (e.g., bits and/or bytes) are transmitted as one or more signals over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. Therefore, for example, a hardware bridge, by itself, may be unable to forward signal packets to a destination device since transmission of signal packets characterized at a higher-layer of a network stack may not be supported by a hardware bridge. Although higher-level layers of a network protocol may, for example, affect device permissions, user permissions, etc., a hardware bridge, for example, may typically provide little user control, such as for higher-level layer operations.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations. A network may be very large, such as comprising thousands of nodes, millions of nodes, billions of nodes, or more, as examples.

For a variety of transactions, including financial, but also including online and/or in-store purchases, which may include goods and/or services, for improved convenience and/or potentially for other reasons, it may be desirable to have an ability to authenticate a user/customer/subscriber/purchaser, typically before completing a transaction, such as in place of or in addition to a typical log-in. In this context, the term transaction and/or similar terms refer to a set of communications and/or actions between at least two parties that reciprocally affect and/or influence the at least two parties to the transaction. Entities that provide identity authentication are referred to here as identity authenticators and/or similar terms. This later term is intended to encompass agents of identity authenticators that may otherwise exist as separate entities. In this context, it is to be understood that identity authentication may be requested for a significant number of users for a significant number of possible situations. For example, millions, tens of millions, hundreds of millions or even more requests may be submitted on a daily basis, for example. Therefore, consistent and workable approaches and/or processes, rather than uniquely customized approaches and/or processes that may otherwise vary by request, may be desired with a large volume of requests.

In a world in which mobile devices, such as cellular telephones, have become ubiquitous, and in which, for example, a mobile subscriber, for example, may have established an identity, such as a mobile identity, with a mobile service provider, a third party, which may again include, but is not limited to, an online merchant, may be willing to interact with a user (e.g., customer, subscriber, purchaser, etc. to sell, extend services, provide access to content, etc.) if identity may be authenticated. Of course, given the nature of transactions, especially with a mobile, electronic world and with transactions taking place via communications network around the clock and around the world, it may be useful to be able to perform identity authentication, such as MIA, relatively quickly, such as in real-time or nearly so. This and/or other aspects of authentication continue to present challenges.

Referring now to FIG. 3, a computing device, such as 1004, may comprise a mobile device that incites a client. In this context, the term mobile device and/or similar terms refer to a computing device and/or a network device including a form factor of a small enough size so that the device is able to be relatively conveniently moved from place to place along with changes in location of a user claiming ownership and/or possession of the mobile device. Examples, without limit, include: laptops, tablets, smart phones, PDAs, game consoles, smart watches, and/or examples of wearable devices, etc.

Thus, in one example of a non-limiting embodiment, a processor (e.g., processing unit), such as 1020, may retrieve and/or execute instructions, such a program, which may, for example, be stored in a memory, such as 1022. Memory 1022 may, for example, comprise Random Access Memory (RAM), which may be included, for example, as part of memory 1024. Memory 1022 may be used to store instructions (e.g., software) executable by a computing device and/or network device, for example. Memory 1022 in addition or alternatively, may comprise a disk drive and/or other nonvolatile storage, such as memory 1026, which may, for example, provide storage of memory states representing various forms of content, for example, including executable program instructions, as suggested. In one embodiment, memory 1026 may provide longer term storage with memory 1024 providing storage typically for a shorter time than that of memory 1026. An input device, such as a computer keyboard and/or mouse, may allow a user to enter content, such as text, for example, thereby, in effect, generating physical signals and/or states capable of being processed, for example, by a computing and/or network device, such as computing device 1004, for example. Of course, in this context, any type of user interaction with a computing device and/or network device is contemplated, including, as non-limiting examples, track ball, touch screen, stylus, etc. Physical (e.g., electronic) signal and/or state communications may take place, such as in the form of output communications. Likewise, physical (e.g., electronic) signals and/or states may be transmitted to a display and/or printer, for example, for human consumption, so to speak, which may be included as part of 1032. Continuing with this non-limiting illustration, computer and/or machine readable medium 1040 may comprise a CD-ROM drive, as one example, that includes a CD-ROM and/or other nonvolatile storage media to transport content, such as executable instructions. A CD-ROM may have encoded thereon executable program instructions, such as optical encodings and/or other types of physical encoding. For example, magnetic charges may be employed in an embodiment. Likewise, a similar mechanism may encode other types of content, including, as examples, images, video, text, audio, etc. Of course, for considerations, including, cost, size, convenience, portability, etc., some of the foregoing features may also be omitted and/or comprise a separate device, such as a display, keyboard, printer, disk drive, etc.

As a general matter, identity authentication, such as mobile identity authentication, may be desirable if a third party wishes to authenticate persistence of the identity of a user (e.g., mobile subscriber). Identity authentication typically relies on verifying (e.g., authenticating) an existing bind and/or association to a persistent mobile identifier, as demonstrated below through illustrative examples. In this context, the term bind, association and/or similar terms refer to a persistent, continuing and objectively verifiable relationship between a user (e.g., person) and a mobile identity, including, as an example, a mobile subscriber and a bank or other financial institution holding his or her bank account. The term mobile identity and/or similar terms in this context refer to an identity that relies on a mobile account relationship (also referred to as a bind and/or association above) of a user as a source of authentication and is capable of being verified by another (e.g., a third party identity authenticator). The term mobile account and/or similar terms in this context refer to a mobile service provider account. It is noted that while a bind need not be permanent, it should have some amount of persistence to be of use in this context.

Assume below that there already has been an event to bind a persistent identifier, e.g., an identifier in which a relationship between the identifier and that which is to be identified is persistent, to a user's mobile identity, such as a mobile account, for example, in a situation in which authentication regarding identity relies on the account relationship with a mobile service provider. In practice, a binding may occur via a conventional online log-in, as an example.

It is likewise noted that authentication may comprise one or more authentications. Thus, for example, mobile identity authentication may likewise comprise one or more MIAs. In some situations, it may also be desirable if a third party were to batch process existing users, for example, rather than requesting mobile identity authentication on a single user basis. In this context, a batch process, therefore, refers to processing several items concurrently, such as in a batch, rather than individually. It is likewise noted that some notifications may be provided as a push notification to an identity authenticator rather than requiring submission of a query through an API, for example.

A bind authentication and/or association authentication may, for example, be employed to supplement or replace a log-in, such as, a log-in with a username and password; however, such an identity authentication, as described, for example, may have advantages, including greater convenience and/or an ability to, in effect, switch off access at a moment's notice if desired or needed, for example. Mobile identity authentication particularly may, therefore, in some cases at least, supplement or replace a request to a user for validation or a request for additional validation, such as, for example, requesting a password, a mother's maiden name, a first pet's name, etc., which may be relatively specific to a user, but, as indicated, may be less convenient, such as if an individual's memory is faulty, for example. Other examples of a request for validation or a request for more validation may include a one-time code, such as may be provided by a device and/or an executable application, like an RSA SecurID token or Google Authentication, as examples.

For a mobile identity authentication embodiment, such as, in one example, based at least in part on status of a mobile account of a mobile subscriber, cookies are typically not required. Mobile identity authentication, in one embodiment, may confirm that a mobile phone number of a user has or has not changed. This may be desirable, for example, in situations in which a third party may desire to make a change to a user account or initiate another action, which may include, as examples, calling a user or treating a user's account as abandoned. Thus, an attempt and/or a determination of mobile identity authentication, for example, even if authentication is not provided may be desirable.

FIG. 4 is a flowchart illustrating a method of identity authentication over a network according to one embodiment, such as MIA. For example, a user, which may, as a non-limiting example, comprise a mobile subscriber, may engage in an online transaction. In this context, the term transaction and/or similar terms, as previously defined, is intended to be construed broadly and not be limited to purchase and/or financial transactions, although those transactions are likewise intended to be included. As non-limiting examples, a transaction may comprise purchase of goods and/or services, access to content, access to financial accounts, access to medical records, access to corporate or organizational intellectual property and/or other types of records and/or files, access to other services, a login without providing user name and password, etc.

In one embodiment, a transaction may, for example, be executed via a web browser. Typically, a web browser executes on a mobile device, which may include a client so that the client may interact with a server via a network, for example. A web browser may in an embodiment be running on a mobile telephone that a mobile subscriber may use to place calls. However, likewise, in some cases, a web browser may instead be running on another computing device, such as a personal computer system, which may or may not be mobile and which may have no connection to a user's mobile telephone, for example. In some situations, but not necessarily for all transactions, a form of payment may be requested. If payment is requested, any or all types of payment mechanisms may be employed, including mobile telephone, credit card, debit card, voucher, merchant credit, pre-paid online account, etc. Thus, for example, mobile identity authentication of one of these forms of payment may be desired, as an example, which may comprise a separate authentication request in some situations.

Typically, a database entry may exist or have been built with respect to a particular user by an identity authenticator, e.g., a party that authenticates persistence of identity regarding a user along the lines previously discussed, as an example. FIG. 1 illustrates an example embodiment of a database entry. Of course, claimed subject matter is not limited in scope to illustrative examples, such as the foregoing. Nonetheless, continuing with an illustrative example, assuming in this example, a mobile service provider is employed to authenticate identity persistence by an identity authenticator, a database (DB) entry of an identity authenticator may include: (1) an identifier of a mobile subscriber account with a mobile service provider, (2) a mobile subscriber unique alias, (3) a mobile telephone number, (4) a mobile subscriber service provider and (5) an international mobile subscriber identifier (IMSI) or similar identifier employed in connection with the particular mobile network of the mobile service provider, in this example, a GSM compatible and/or compliant telecommunications network. Other examples of identifiers may comprise an international mobile equipment identifier (IMEI), a mobile equipment identifier (MEID) and/or other identifiers in addition, such as a mobile subscriber account number/identifier and/or billing account number/identifier. For example, a DB entry may include other attributes (not shown), such as past transaction related attribute entries, including, as non-limiting examples, merchants and/or other third party requesters, dates, description of transactions completed, and also including change events, such as associated with one or more of the following, for example: (1) mobile service provider, (2) IMSI (or other subscriber ID), (3) IMEI (or device equivalent), (4) mobile number, and/or (5) network status. In this context, the term change event refers to a change for a user of one or more attributes tracked within a database used for identity authentication. As shall be discussed, since one or more attributes used for identity authentication may have changed, it is generally desirable to resolve whether the change is one that does not significantly affect mobile identity for the user or one that does significantly affect mobile identity for the user. For example, closing by a user of mobile account would likely significantly affect mobile identity; however, a change of the mobile telephone number, if adequately verified, typically would not. Change events shall be discussed in more detail later.

In an illustrative embodiment, a third party may generate and/or initiate an electronic transmission to an identity authenticator in connection with a transaction, such as via a computing and/or communications network. For example, this may comprise any type of electronic transmission, such as, for example, a query to an application programming interface (API), a server redirect, a hyperlink transmission, an email, a short message service (SMS) message, push notification, a secure file transfer protocol ((S)FTP) file transfer, etc. In an embodiment in which a mobile account (e.g., a mobile provider account for a mobile subscriber) may be employed for authentication, again, as a non-limiting example, a mobile telephone number for a user may typically, but not necessarily, be included in a transmission. Any number of transactions may be processed in an embodiment, of course, and some transactions may be simultaneously and/or concurrently processed with other transactions, as alluded to previously. Although claimed subject matter is not limited in scope in this respect, as potential, non-limiting, examples, illustrative embodiments are described in U.S. Pat. No. 8,606,640, titled "System and method for paying a merchant by a registered user using a cellular telephone account," issued on Dec. 10, 2013, to Brody et al., herein incorporated by reference in its entirety.

Continuing with this non-limiting, illustrative example, as a result of a third party request, an identity authenticator may initiate a request for particular content, such as to particular mobile telephone service providers and/or to a third party aggregator of mobile subscriber accounts, by, for example, submitting a query through an API and/or other manner with respect to a particular user. In an embodiment, using a mobile telephone number received, content potentially requested in response to an mobile identity authentication request may include, as examples: (1) an identifier of the mobile service provider, (2) status of the user's account (e.g., suspended or disabled), (3) mobile phone status (e.g., on or off), and/or (4) an IMSI (International Mobile Subscriber Identifier) of a module for a mobile device, such as a SIM card, for example, and/or (5) other identifier(s). In general, a module refers to a separable component that may be interchangeable with other components of a device of differing size and/or complexity, such as a mobile device, for example. Thus, a module refers to a swappable or removable component, including, for example, a SIM card and/or similar cards within a device, which are typically designed to be replaceable. Of course, a variety of requests and/or queries are possible. For example, different content, such as described, for example, may be queried at different times in some embodiments. In this context, submitting a query and/or similar terms refers to making a request for content electronically, such via an electronic communication, but is otherwise not intended to be limited to a particular format or approach. Thus, a query is not limited to use of an API, for example.

Likewise, a single user and a single third party is described, however, again, claimed subject matter is not limited to an illustrative example. A variety of non-limiting, illustrative examples are discussed below. For example, a third party may initiate a request for authentication through various actions and/or a user may do so. Immediately below are further non-limiting, illustrative examples.

A user may log into a bank account via a web browser or an executable application on a mobile device, for example. Thus, a bank (e.g., Chase, Citi) and/or other financial institution, for example, may, as a result, initiate a query, such as via an API to an identity authenticator, for example, such as in an example embodiment, an API substantially compatible and/or substantially compliant with HTTP and/or HTTPS, including versions now known and/or to be later developed, and/or another suitable protocol (e.g., now known and/or to later developed).

In the foregoing example, a user may seek to take one or more actions with respect to an account, such as potentially high risk actions, like, to provide only a few illustrative examples, transferring funds, viewing transactions history, making a payment, updating personal content, etc. In these cases, as an illustration, an identity authenticator may authenticate an existing bind either to replace or to supplement more traditional log-ins/prompts designed to provide security. In some situations, as an example, mobile identity authentication may comprise a component of a two-factor authentication, for an embodiment. Likewise, if appropriate, following mobile identity authentication, user identity profile updates may take place.

As another illustration, a user may seek to log into an existing account with a merchant. Thus, a merchant (e.g., Amazon, iTunes) may, as a result initiate a query, such as via an API, as was described above, for example. Thus, an identity authenticator may, again, authenticate an existing bind. For example, a user may initiate a payment with a credit/debit card, bank account, and/or other form of payment (like a pre-paid value such as stored in 'the cloud.') This could include, as a form of payment, a mobile account that is already "on file" with the merchant. Thus, an identity authenticator may likewise authenticate identity with respect to a mobile account before a merchant is permitted to employ for payment a previously provided account, for example, in a particular case.

As yet another illustration, a user may seek to log onto a mobile device, for example, to create, share and/or edit a file. A security service (e.g., RSA, Blue Coat), managing networks and/or devices may submit queries, such as via an API, such as, again, for MIA. Thus, a third party may take action to authenticate a user via an identity authenticator in this example situation.

As another example, a user may seek to access, via a mobile device, files stored using DropBox. Thus, a software company (e.g., DropBox) may initiate an MIA query. For example, DropBox has a level of security in which a user enters a one-time code which may be stored via an app on the mobile device, such as Google Authenticator, that is operative to store a secret key associated with the DropBox account if the user wants to access files from a Dropbox server; however, MIA, as previously described, may be used in addition to or in place of that approach, for example. For example, change events may not be supported In a variety of situations. As simply one example, DropBox does not support change events. Thus, currently, if a user changes phones, a reasonable common occurrence, DropBox may lock her or him out a quite cumbersome process for validating the user.

A user may seek to access an online account and a third party may seek to protect access appropriately at least in part for reasons of confidentiality. Thus, yet another software company and/or product (e.g., TurboTax), in accordance with this example, may similarly use mobile identity authentication services. One may also consider similar variations in which confidentiality may not be an aspect. For example, for premium content management, a user may seek to access content because he has an online New York Times subscription. In another variation, a user may desire to access content whether it is personalized (e.g., Facebook) or not (e.g., ESPN). In another scenario, a user could be returning to a website or application, and the website or application could be dependent at least in part on an open ID service to authenticate a bind for tracking and/or other reasons. Thus, a third party may make use of an open ID service (e.g., Google, Facebook) that may bind a user with a website or with an application, such as for a user's account. If so, MIA could be performed, as in the other examples, to authenticate identity and/or an existing bind for a third party.

As another example, a user may 'click' a 'click-to-call' button of a website or application to reach customer care. Thus, a third party may comprise a customer care facility of an enterprise, for example, such as a care facility of a bank. A user click may result in a query to an identity authenticator who is able to authenticate identity. As a result of MIA, a call may be placed and a user profile may be updated, as appropriate, for example.

In addition to the foregoing situations, another situation that may arise and be potentially beneficial may occur if a user accesses a website of a financial institution, but does not remember a user name and/or password. Typically, without a user name and password, a financial institution should not provide access to accounts and/or related content, again, at least in part due to confidentiality, however, access may be granted with mobile identity authentication. As an example, a user may be accessing the website via a known mobile device or opening an application executable on the mobile device, such as previously described. However, the user may not remember a username and/or password and may not have it stored or otherwise accessible via the mobile device. Therefore, the financial institution may generate a mobile identity authentication query. If mobile identity is authenticated, for example, as expected with no recent changes (e.g. no report of a stolen mobile device), the financial institution may provide the user appropriate access to reset login credentials rather than delaying access, the latter which may involve a call to customer service of the institution or some other mechanism that may be relatively inconvenient.

Yet another scenario may revolve around confidentiality associated with medical records of patients, such as compliance with HIPPA, the Accountable Care Act, Electronic Medical Records and/or other regulatory schemes. A variety of potential situations may arise in which a user may seek access to records, such as a patient, a company, such as for insurance, as an example, a hospital, a medical professional providing care, etc. Thus, again, a user or authorized agent may log into a user's medical record account that may exist online and/or be stored electronically, such as on site. This login attempt may initiate a query, such as via an API, as was described above, for example. Thus, an identity authenticator may again authenticate an existing bind and if authentication is provided, grant access. If authentication is not provided, an alert may be provided to the party responsible for maintaining the records, again, merely to illustrate a possible approach without limitation.

Likewise, as was mentioned, in an embodiment, a third party may initiate a mobile identity authentication request. For example, any of the third parties above might seek to do batch checks of existing users for updating and/or quality control purposes. Likewise, any of these parties may seek to do an ad hoc check for similar reasons, which may include an attempt to contact the user identified as the current user in a DB entry. For example, it may be desirable to confirm in advance that the correct person will be contacted to avoid legal fines. Other considerations for mobile identity authentication in this situation may include: to avoid poor customer reaction, to maintain security, etc.

As yet another example, for a variety of corporate programs, including as examples, airline mileage plus miles, gift cards, etc., in which value has been accumulated, it may be desirable to have a convenient mechanism to retire outdated, existing accounts by confirming that an indicated user identity is not current or correct. Mobile identity authentication, such as substantially in accordance with techniques as previously described, for example, may be part of such a mechanism so that cost to retire an account remains at a manageable level. That is, MIA may be after a period of non-use included in a process to show the user cannot be found or is otherwise unavailable for some significant reason, which may include incapacity or death, for example.

As indicated, FIG. 1 is an example embodiment of a DB entry. Likewise, FIG. 2 is an example embodiment of an expanded DB entry. It is noted that while FIGS. 1 and 2 show attributes for a DB entry and an expanded entry, respectively, attributes for an entry associated with a user may be logically associated in memory without necessarily being physically co-located. For example, memory pointers and/or other related database type memory management techniques may be employed.

In one embodiment, as shown in FIG. 1, a database entry may match a carrier (e.g., mobile service provider) to CDMA, GSM, and/or another appropriate protocol. Likewise, a database entry may include type of communication network for a mobile service provider in an embodiment. In still another embodiment, one or more APIs substantially compatible and/or substantially compliant with one or more particular protocols may be used, as was described. Past, present, and/or future versions of HTTP and/or HTTPS were mentioned as non-limiting examples, although other now known and/or to be later developed protocols may also be suitable. Thus, an API, for example, in an embodiment, may be used to retrieve attributes from a DB entry associated with a mobile telephone number and/or other persistent mobile identifier in a mobile subscriber database that may be maintained by an identity authenticator, for example, in situations in which persistence of mobile service provider account is able to provide a basis for mobile identity authentication.

There, of course, may be many different ways of handling user registration, including mobile subscriber registration with an identity authenticator, and claimed subject matter is not limited in scope to a particular approach. Aforementioned, U.S. Pat. No. 8,606,640 (the '640 patent) provides some non-limiting illustrations, although, again, claimed subject matter is not intended to be limited to aspects described by the '640 patent. Likewise, if payment is appropriate, after a user is authenticated, a payment may be processed by any one of host of various approaches, many of which are known and, therefore, in general, no further explanation is provided here as a result. Again, claimed subject matter is not limited in scope to a particular approach.

In general, an identity authenticator, such as for MIA, seeks to match an identifier for a user with a known mobile identity, for example. In an embodiment, if an IMSI, as an example, is requested and received, such as by making a query to a mobile service provider and/or to an aggregator of mobile subscriber accounts, but the received IMSI does not match the particular IMSI stored, mobile identity authentication may not necessarily be provided. Thus, in one embodiment, if an appropriate identifier, in this example, an IMSI, is requested and received, but does not match the identifier stored by an identity authenticator, an identity, here a mobile identity, may not necessarily be authenticated.

Failure to authenticate identity, such as a mobile identity, may take place a variety of ways. Claimed subject matter is not intended to be limited to a particular approach. For example, entries in a DB for an identity to be authenticated may be provided to a third-party requestor and/or an error message may be generated and communicated, as examples. Nonetheless, ultimately, in some cases, mobile identity authentication may not necessarily be provided.

In some cases, if this occurs, a third party that made a request for identity authentication, such as MIA, for example, may attempt to employ other identity authentication techniques, which may take place various ways. As non-limiting examples, a third party may request a user id and password, a cookie and password, and/or special personal identifiers, such as a maiden name, a pet's name, etc.

In contrast, of course, if an IMSI, continuing with the example, requested and received does match the IMSI stored for the identity to be authenticated, however, the particular transaction may continue and the mobile identity database entry may be updated with an IMSI change event in this example, if appropriate. For example, a binding with a mobile identity may be authenticated through a mobile service provider, again, in this example. Thus, depending on particulars of a transaction, content access may be granted, a purchase may be processed, etc.

As previously indicated, the foregoing is merely an illustrative embodiment and claimed subject matter is not limited in scope to illustrative examples. Furthermore, as the previously description illustrates, identity authentication takes place in a manner so that inappropriately providing identity authentication rarely, if ever, occurs. However, conversely, situations may arise where identity authentication should be provided, except that accurate and/or timely identity related updates are not necessarily available. In some situations, such as in which a mobile service provider account is employed to authenticate identity persistence, for example, mobile identity authentication may not be provided in a timely manner, if at all, without an appropriate mobile subscriber account update, such as to resolve an account attribute change event.

As mentioned previously, the term change event refers to a change for a user of one or more attributes tracked within a database used for identity authentication. As shall be discussed, since one or more attributes used for identity authentication may have changed, it is generally desirable to resolve whether the change is one that does not significantly affect mobile identity for the user or one that does significantly affect mobile identity for the user. For example, closing by a user of mobile account would likely significantly affect mobile identity; however, a change is mobile telephone number, if adequately verified, typically would not.

As an illustrative example, continuing with the mobile service provider account example, a mobile subscriber may port a mobile telephone number to another mobile service provider. If a service providing identity authentication (e.g., mobile identity authenticator) is not aware that porting has taken place, it would appear as if a mobile subscriber account has been closed with the particular mobile service provider that is currently indicated to the identity authenticator. Therefore, mobile identity authentication, for example, may not be provided, although the mobile subscriber may have a valid and active mobile account.

Rather, a default approach to identity authentication, such as MIA, in situations in which entries stored do not match results, such as may be returned by a query of an appropriate mobile service provider and/or an aggregator service, may be that identity authentication is not provided, to avoid a risk of incorrectly providing identity authentication until aspects of the particular mobile subscriber and/or associated mobile account are updated to the identity authenticator. Furthermore, in this illustrative example, another database (DB) entry for the particular mobile subscriber might be created as a result of porting the mobile number to another mobile service provider, resulting in loss of continuity, for example, which may also be undesirable from a persistent mobile identity authentication perspective.

Likewise, a failure to authenticate an identity, such as in the situation just described, for example, may create inconvenience and/or may result in additional identity authentication processes being instituted, yet where such additional processes may not be needed. For example, a call to customer care and/or providing a password and/or personal identifiers, such as a mother's maiden name, etc., may be employed, which, of course, may be inconvenient. Thus, an approach to address such situations is desirable, as an example, so that timely identity authentication may be provided if appropriate, yet also without increasing risk of inappropriately providing identity authentication for situations in which authentication should not be provided.

In an embodiment, as an example, a method may be employed to reduce risk of incorrectly failing to authenticate identity, such as failing to validate a mobile account of a mobile subscriber to a third party requester. This is illustrated by FIG. 4, for example. As discussed previously, various parties may request identity authentication, whether initiated by a user or by a third party. These may include, as illustrative examples that were previously described, finance institutions, such as banks, credit unions, credit card issuers, etc., content providers, device managers, network providers, storage providers, etc.

For example, in an embodiment, a mobile subscriber identifier may be associated with a mobile telephone number for a mobile subscriber in a DB entry, as previously described, for example, such as an IMSI and/or similar cellular network identifier. Likewise, in an embodiment, another identifier for purposes of authentication, which may in an embodiment comprise a uniquely created identifier, such as a mobile service provider account number, may also be employed. Likewise, one or more other identifiers may also comprise an email address, a URL, other network communications related address, and/or location.

As indicated, in at least one embodiment, typically a DB entry may be built (e.g., generated), such as corresponding to a particular mobile subscriber, illustrated in FIG. 4 by 510, for example. Thus, in an embodiment, substantially in accordance with claimed subject matter, a DB entry may be expanded, illustrated by 520. Likewise, illustrated by 530 and 540, a mobile service provider and/or an aggregator of mobile service provider accounts, for example, may be queried, as previously discussed, and one or more attributes may be populated using responses obtained to one or more queries. Thus, if a request for identify authentication is received later, in an embodiment, an expanded DB entry provides a capability to provide more accurate and/or timelier mobile authentication responses than currently available, such as in response to a mobile identity authentication request, illustrated by 550. For example, doing so may be desirable in an embodiment, rather than, relying on an identity authentication default in response to a third party request. Again, an example embodiment of an expanded DB entry, such as to accommodate potential change events, is shown in FIG. 2.

For example, in a variety of situations, several of which are described in more detail below, an identity authenticator receiving a request for identity authentication, such as MIA, may, in absence of up to date content with respect to a particular mobile subscriber, continuing with the illustrative example, may delay responding and/or simply not provide mobile identity authentication, as a default, rather than risk inappropriately providing identity authentication for a particular mobile subscriber. Thus, in this context, this is referred to as an identity authentication default. Here, in absence of an update, it provides an approach to the situation that is less risky from the perspective of an identity authenticator and/or third party. As also mentioned previously, having a default may be particularly useful where, as here, a large number of authentication requests are being made in real-time or near real-time.

However, expanding a DB entry, as shall be described for one or more illustrative embodiments, may permit more accurate and/or timelier responses so that reliance on an identity authentication default and/or a delay in response may be reduced. As previously described, one example situation may comprise porting a mobile telephone number to a different mobile service provider. As another example, a mobile subscriber may change to a different mobile device, but otherwise maintain an existing mobile telephone number and an existing mobile service provider. Without an update, these may represent situations in which providing identity authentication in response to a query and/or a request may also be risky. Thus, as suggested, a party that operates to provide an identity authentication service for third party requesters may delay and/or not provide identity authentication, such as MIA, for example. That is, a default may be employed in the absence of having an appropriate update regarding a particular mobile subscriber and/or mobile account for which identity authentication may be requested.

Likewise, if, for example, a party that operates to provide identity authentication services relies on a default that comprises a response to a request which, in effect, does not provide identity authentication, as previously described, such as providing DB entries regarding the particular mobile subscriber and/or one or more error codes, as was discussed previously, for example, a third party requester may likewise rely on a default of not providing service, completing a transaction, etc. Thus, for example, a transaction may be lost, for example, despite existence of a valid and active mobile account for a particular mobile subscriber. Alternatively, continuing with this illustrative example, as previously suggested, instead other, more onerous identity authentication procedures, such as by the requester, again, as simply an example, may be employed. Typically, thus, it is desirable to reduce the number of times this takes place.

For example, in an embodiment, an expanded DB entry may comprise an attribute to reflect a change event. Change events were previously described. For example, a change in mobile telephone device having the particular mobile telephone number, such as for the latter example provided above, comprises an illustration of a change event. Likewise, an attribute may also indicate a current mobile telephone device, described in more detail below.

More generally, in an embodiment, an expanded DB entry may further comprise adding multiple additional attributes to a DB entry, for example, to address a variety of potential change event situations, including some previously mentioned, such as a change in mobile service provider, IMSI (or other subscriber ID), IMEI (or device equivalent), (4) mobile number, and/or network status. As was also mentioned, millions of requests if not more may be received in real-time or near real-time. Therefore, a systematic approach to resolving change events or resolving change events more quickly may potentially be beneficial, rather than relying on a default, for example, but that which is able to be implemented on a large scale, may be desirable.

Likewise, an embodiment may further comprise populating at least one of the multiple additional attributes for at least one mobile subscriber in the DB. Of course, depending at least in part on particulars regarding mobile subscribers, multiple additional attributes for multiple mobile subscribers may be populated. Again, as simply another illustrative example, a mobile subscriber may change mobile service provider and mobile device. Thus, multiple additional attributes may therefore be populated in this illustrative example.

It is noted that, as a general principle, another embodiment feature may include not necessarily relying on and/or providing identity authentication default if populating an attribute that was previously empty. Again, with millions of real-time requests or more, an approach capable of being implemented on a relatively large scale may be potentially beneficial. Thus, such a feature may provide value in at least some embodiments, since typically a change event for an attribute may otherwise trigger reliance on an identity authentication default until a satisfactory confirmation of a valid reason for a change event occurrence that does not significantly impact mobile identity is resolved. For example, as was discussed as an illustration, if querying a mobile service provider indicates that an account is closed, until it is known that the mobile number has been ported to another service provider, an identity authenticator may appropriately rely on a default approach. Thus, with large numbers of requests and small amounts of time available to resolve a request, from a risk perspective ordinarily it may be desirable to be over inclusive and flag any change in attribute for a user, for example. However, a feature as just described, in which populating an empty attribute does not necessarily trigger an identity authentication default, may be employed to limit over inclusion, even for large scale implementations.

For an embodiment, such as the two foregoing examples, attributes for a current mobile device and a current mobile service provider, for example, may be included and populated as part of expanding a database entry. Likewise, a DB entry also may include one or more attributes to indicate dates of activation and/or de-activation for mobile telephone numbers with respect to a particular mobile subscriber. Thus, in an embodiment, at least one populated attribute of at least one mobile subscriber may be provided at least as part of a response to a third party request for mobile identity authentication with respect to the mobile subscriber, for example. However, of course, more than one populated attribute may also be provided, if applicable, as described above.

Continuing with the foregoing example, responsive to a request for identity authentication, such as MIA, authentication may be provided. Furthermore, populated attributes previously described may be provided at least in part in response to a request and/or populated attributes may be employed at least in part in connection with generating a response, even if such attributes might not specifically be provided in the response provided to the third party.

Typically, a mobile service provider and/or an aggregator of mobile accounts may be queried to determine status of attributes to obtain content for populating a DB entry. For example, in connection with a previously discussed example, a mobile service provider (and/or aggregator) may be queried to populate an attribute to reflect porting of a current mobile telephone number to another mobile service provide. A variety of industry conventions may exist depending on industry particulars. For example, in the case of mobile service providers, as an example, one might envision a query to a new provider, to a previous provider, and/or to an aggregator.

It is noted that until a mobile service provider is queried and a response is obtained, uncertainty may typically remain regarding account status, such as if it appears an attribute or attributes have changed in some way, as previously described, for example. Thus, a delay in obtaining up to date status may represent risk, for a third party making an identity authentication inquiry and/or for an identity authenticator. For example, a user may decide to cancel a transaction and/or use another provider rather than tolerate a delay. However, likewise, an accurate identity authentication is also desired before proceeding with a transaction, for example. Thus, if delay could be reduced, such as described below, for example, such reduction would be beneficial from a transactional perspective, for example.

Depending on specifics, in an embodiment, a time stamp may be employed in communications with a mobile service provider and/or mobile account aggregator. For example, in some cases, a real time feed from a mobile service provider and/or from elsewhere may be processed. As one example, a change in mobile telephone number may be monitored through a real time feed. For a real time feed, however, it may be desirable to also take into account geographic source, and as a consequence, appropriate time zone. As indicated above, delay may present risk of various sorts, for a party providing identity authentication and/or for a third party requesting identity authentication. Thus, for an automated real time feed, a time stamp or similar approach to accounting for timing of additional content, for example, may not generally be adjusted for the time zone of the parties that receive such content. However, in an embodiment, a DB entry may be appropriately adjusted to reflect time zone of a real time source. Thus, for identity authentication queries, timelier responses as to status, such as if a mobile subscriber account provides identity persistence, as an example, may be made possible.

For purposes of illustration, FIG. 3 is an illustration of an embodiment of a system 100 that may be employed in a client-server type interaction, such as described infra. in connection with rendering a GUI via a device, such as a network device and/or a computing device, for example. In FIG. 3, computing device 1002 ('first device' in figure) may interface with client 1004 ('second device' in figure), which may comprise features of a client computing device, for example. Communications interface 1030, processor (e.g., processing unit) 1020, and memory 1022, which may comprise primary memory 1024 and secondary memory 1026, may communicate by way of a communication bus, for example. In FIG. 3, client computing device 1002 may represent one or more sources of analog, uncompressed digital, lossless compressed digital, and/or lossy compressed digital formats for content of various types, such as video, imaging, text, audio, etc. in the form physical states and/or signals, for example. Client computing device 1002 may communicate with computing device 1004 by way of a connection, such as an internet connection, via network 1008, for example. Although computing device 1004 of FIG. 3 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1020 may be representative of one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In implementations, processor 1020 may perform signal processing to manipulate signals and/or states, to construct signals and/or states, etc., for example.

Memory 1022 may be representative of any storage mechanism. Memory 1020 may comprise, for example, primary memory 1022 and secondary memory 1026, additional memory circuits, mechanisms, or combinations thereof may be used. Memory 1020 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1020 may be utilized to store a program. Memory 1020 may also comprise a memory controller for accessing computer readable-medium 1040 that may carry and/or make accessible content, which may include code, and/or instructions, for example, executable by processor 1020 and/or some other unit, such as a controller and/or processor, capable of executing instructions, for example.

Under direction of processor 1020, memory, such as memory cells storing physical states, representing, for example, a program, may be executed by processor 1020 and generated signals may be transmitted via the Internet, for example. Processor 1020 may also receive digitally-encoded signals from client computing device 1002.

Network 1008 may comprise one or more network communication links, processes, services, applications and/or resources to support exchanging communication signals between a client computing device, such as 1002, and computing device 1006 ('third device' in figure), which may, for example, comprise one or more servers (not shown). By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1004, as depicted in FIG. 3, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1022 may store cookies relating to one or more users and may also comprise a computer-readable medium that may carry and/or make accessible content, including code and/or instructions, for example, executable by processor 1020 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, $4^{th}$, $5^{th}$ or 6th generation (2G, 3G, 4G, 5G, 6G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example. Likewise, an interface, such as a client interface may be entirely virtual, of course, as is becoming more common.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twifter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, NetBEUI, IPX, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method to reduce risk of incorrectly failing to authenticate a mobile identity as valid to a third party making a request for mobile identity authentication (MIA) of a mobile subscriber comprising:
    associating an identifier with a pre-established mobile identity for the mobile subscriber in a database entry of a mobile database, wherein the pre-established mobile identity comprises an identity that relies at least in part on a relationship of the mobile subscriber to a mobile service provider account as a source of authentication; and
    expanding the database entry with one or more mobile subscriber and/or network related changes to be capable to provide more accurate and/or timelier mobile identity authentication (MIA) responses regarding the mobile subscriber to the third party request based, at least in part, on querying one or more mobile service providers and/or other third parties, including one or more mobile subscriber account aggregators, for an international mobile subscriber identifier (IMSI) in the expanded database entry so as to reduce reliance on a mobile identity authentication (MIA) default, including reliance by the third party making the request for mobile identity authentication (MIA).

2. The method of claim 1, wherein the identifier comprises at least one mobile subscriber identifier with a particular mobile service provider for a particular mobile subscriber.

3. The method of claim 2, wherein the at least one mobile subscriber identifier comprises more mobile subscriber identifiers than the at least one mobile subscriber identifier.

4. The method of claim 3, wherein the more mobile subscriber identifiers further include a mobile subscriber account identifier and/or billing account identifier of the particular mobile service provider.

5. The method of claim 2, wherein the at least one mobile subscriber identifier comprises an identifier of a replaceable module for a mobile device.

6. The method of claim 5, wherein the module comprises a SIM card and the identifier of the module comprises the IMSI as the at least one mobile subscriber identifier.

7. The method of claim 2, wherein the at least one mobile subscriber identifier comprises an IMEI and/or an MEID.

8. The method of claim 2, wherein the third party request comprises a financial institution request for mobile identity authentication of a mobile subscriber accessing a website of the institution as a customer of the institution or executing a mobile application of the institution as a customer of the institution.

9. The method of claim 1, wherein the associating includes associating an alias identifier in addition to the identifier associated with the pre-established mobile identity.

10. The method of claim 2, wherein the expanded DB entry comprises one or more attributes to reflect one or more change events.

11. The method of claim 10, wherein the expanding the entry comprises adding multiple additional attributes to the DB entry for the one or more change events.

12. The method of claim 11, and further comprising querying for one or more of the multiple additional attributes.

13. The method of claim 11, and further comprising populating at least one of the multiple additional attributes of the DB entry for at least one mobile subscriber in the DB in response to one or more change events.

14. The method of claim 13, wherein a change event comprises an IMSI change via replacement of a SIM card for the particular mobile device having the particular mobile service provider account for the particular mobile subscriber.

15. The method of claim 14, and further comprising populating the appropriate one or more attributes to reflect the IMSI change associated with replacement of the SIM card for the mobile device having the particular mobile service provider account for the particular mobile subscriber.

16. The method of claim 13, wherein a change event comprises at least one of an IMEI change, an MEID change, and/or a mobile device change for the particular mobile service provider account and the particular mobile subscriber.

17. The method of claim 16, and further comprising populating the appropriate one or more attributes to reflect the change in IMEI, MEID, and/or a mobile device for the particular mobile service provider account and the particular mobile subscriber.

18. The method of claim 13, wherein a change event comprises a change in mobile service provider for a current mobile telephone number.

19. The method of claim 18, and further comprising populating the appropriate one or more attributes to reflect the change in the particular mobile service provider for a current mobile telephone number for the particular mobile subscriber.

20. An apparatus comprising:
a computing device;
the computing device operable to associate a mobile subscriber identifier with a pre-established mobile identity for a mobile subscriber in a database entry of a mobile database, wherein the pre-established mobile identity is to comprise an identity that is to rely at least in part on a relationship of a mobile subscriber to a mobile service provider account as a source of authentication, and
the computing device to expand the database entry with one or more mobile subscriber and/or network related changes to be capable to provide more accurate and/or timelier mobile identity authentication (MIA) responses regarding the mobile subscriber to a third party request for mobile identity authentication (MIA) of the mobile subscriber based, at least in part, on a query to one or more mobile service providers and/or other third parties, including one or more mobile subscriber account aggregators, for an international mobile subscriber identifier (IMSI) in the expanded database entry so as to reduce reliance on a mobile identity authentication (MIA) default, including reliance by the third party making the request for mobile identity authentication (MIA), and to consequently reduce risk of incorrectly failing to authenticate the mobile identity as valid to the third party making the request for mobile identity authentication (MIA) of the mobile subscriber.

21. The apparatus of claim 20, wherein the mobile subscriber identifier is to comprise an identifier of a replaceable module for a mobile device.

22. The apparatus of claim 21, wherein the module is to comprise a SIM card and the identifier of the module is to comprise an IMSI as the mobile subscriber identifier.

23. The apparatus of claim 20, wherein the mobile subscriber identifier is to comprise an IMEI and/or an MEID.

24. The apparatus of claim 20, wherein the expanded DB entry is to comprise one or more attributes to reflect one or more change events.

25. The apparatus of claim 24, wherein the computing device is further operable to query for the one or more attributes.

26. The apparatus of claim 25, wherein the computing device is further operable to populate at least one of the one or more attributes of the DB entry for at least one mobile subscriber in the DB in response to one or more change events.

27. The apparatus of claim 26, wherein a change event is to comprise an IMSI change via replacement of a SIM card for the particular mobile device having the particular mobile service provider account for the particular mobile subscriber.

28. The apparatus of claim 27, wherein the computing device is further operable to populate the appropriate one or more attributes to reflect the change in IMSI associated with replacement of the SIM card for the mobile device having the particular mobile service provider account for the particular mobile subscriber.

29. The apparatus of claim 26, wherein a change event is to comprise at least one of an IMEI change, an MEID change, and/or a mobile device change for the particular mobile service provider account and the particular mobile subscriber.

30. The apparatus of claim 29, wherein the computing device is further operable to populate the appropriate one or more attributes to reflect the change in IMEI, MEID, and/or a mobile device for the particular mobile service provider account and the particular mobile subscriber.

31. The apparatus of claim 26, wherein a change event is to comprise a change in mobile service provider for a current mobile telephone number.

32. The apparatus of claim 31, wherein the computing device is further operable to populate the appropriate one or more attributes to reflect the change in the particular mobile service provider for a current mobile telephone number for the particular mobile subscriber.

33. An article comprising:
a non-transitory storage medium having stored thereon instructions executable by a computing device to associate a mobile subscriber identifier with a pre-established mobile identity for a mobile subscriber in a database entry of a mobile database, wherein the pre-established mobile identity is to comprise an identity that is to rely at least in part on a relationship of a mobile subscriber to a mobile service provider account as a source of authentication, and executable by the computing device to expand the database entry with one or more mobile subscriber and/or network related changes to be capable to provide more accurate and/or timelier mobile identity authentication (MIA) responses regarding the mobile subscriber to a third party request for mobile identity authentication (MIA) of the mobile subscriber based, at least in part, on a query to one or more appropriate mobile service providers and/or other third parties, including one or more mobile subscriber account aggregators, for an international mobile subscriber identifier (IMSI) in the expanded database entry so as to reduce reliance on a mobile identity authentication (MIA) default, including reliance by the third party making the request for mobile identity authentication (MIA), and to consequently reduce risk of incorrectly failing to authenticate the mobile identity as valid to the third party making the request for mobile identity authentication (MIA) of the mobile subscriber.

34. The article of claim 33, wherein the mobile subscriber identifier is to comprise an identifier of a replaceable module for a mobile device.

35. The article of claim 34, wherein the module is to comprise a SIM card and the identifier of the module is to comprise the IMSI as the mobile subscriber identifier.

36. The article of claim 33, wherein the mobile subscriber identifier is to comprise an IMEI and/or an MEID.

37. The article of claim 33, wherein the expanded DB entry is to comprise one or more attributes to reflect one or more change events.

38. The article of claim 37, wherein the instructions are further executable to query for the one or more attributes.

39. The article of claim 38, wherein the instructions are further executable to query the one or more appropriate mobile service providers and/or the other third parties, including the one or more mobile subscriber account aggregators, for the one or more attributes.

40. The article of claim 38, wherein the computing device is further operable to populate at least one of the one or more attributes of the DB entry for at least one mobile subscriber in the DB in response to one or more change events.

41. The article of claim 37, wherein a change event is to comprise an IMSI change via replacement of a SIM card for the particular mobile device having the particular mobile service provider account for the particular mobile subscriber.

42. The article of claim 41, wherein the instructions are further executable to populate the appropriate one or more attributes to reflect the IMSI change in IMSI associated with replacement of the SIM card for the mobile device having the particular mobile service provider account for the particular mobile subscriber.

43. The article of claim 37, wherein a change event is to comprise at least one of an IMEI change, an MEID change, and/or a mobile device change for the particular mobile service provider account and the particular mobile subscriber.

44. The article of claim 43, wherein the instructions are further executable to populate the appropriate one or more attributes to reflect the change in IMEI, MEID, and/or a mobile device for the particular mobile service provider account and the particular mobile subscriber.

45. The article of claim 37, wherein a change event is to comprise a change in mobile service provider for a current mobile telephone number.

46. The article of claim 45, wherein the instructions are further executable to populate the appropriate one or more attributes to reflect the change in the particular mobile service provider for a current mobile telephone number for the particular mobile subscriber.

* * * * *